(12) United States Patent
Chowdhary et al.

(10) Patent No.: US 6,675,278 B1
(45) Date of Patent: Jan. 6, 2004

(54) METHOD AND APPARATUS FOR MANAGING MEMORY

(75) Inventors: Dipendra Chowdhary, Magill (AU); Dhiwakar Viswanathan, Prospect (AU); Sung-Ho Jee, Leeming, WA (US); Peter McGinn, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/552,389

(22) Filed: Apr. 19, 2000

(51) Int. Cl.[7] ............................................. G06F 12/00
(52) U.S. Cl. ........................ 711/203; 711/103; 711/112; 711/206
(58) Field of Search ................................ 711/103, 202, 711/203, 206, 207, 112; 305/189.04; 707/201; 713/600

(56) References Cited

U.S. PATENT DOCUMENTS

| | | | |
|---|---|---|---|
| 4,835,734 A | | 5/1989 | Kodaira et al. ............. 711/209 |
| 4,866,604 A | * | 9/1989 | Reid .......................... 713/600 |
| 6,202,138 B1 | * | 3/2001 | Estakhri et al. ........ 365/189.04 |
| 6,212,647 B1 | * | 4/2001 | Sims et al. ................. 711/112 |
| 6,360,220 B1 | * | 3/2002 | Forin .......................... 707/201 |
| 6,427,186 B1 | * | 7/2002 | Lin et al. ................... 711/103 |
| 6,496,808 B1 | * | 12/2002 | Aiello et al. ................. 705/67 |

OTHER PUBLICATIONS

Tanenbaum, Andrew S. "Modern Operating Systems." Prentice Hall, 1992, pp. 84–87.

* cited by examiner

*Primary Examiner*—Donald Sparks
*Assistant Examiner*—Brian R. Peugh
(74) *Attorney, Agent, or Firm*—Daniel K. Nichols (57) ABSTRACT

A method and apparatus of managing a memory (2) having a number of pages (5) involves mapping the physical pages (5) to corresponding pages (4) in a logical address space (1) using a map table (3). When the number of pages utilised by an application increases or decreases, or if an application is deleted or a new application is loaded, the physical pages used by the remaining applications are unchanged, but the logical pages are moved so that the logical pages used by a single application are contiguous and so that the unused pages are contiguous. Thus, after moving the logical pages, the mapping of the logical pages to the physical pages is updated and a free page pointer (6) indicates the next available free logical page.

5 Claims, 6 Drawing Sheets

METHOD AND APPARATUS FOR MANAGING MEMORY

FIELD OF THE INVENTION

This invention relates to a method and apparatus for managing a memory, especially Non-Volatile Memory (NVM), for example Electrically Erasable Programmable Read Only Memory (EEPROM) or Flash Memory.

BACKGROUND OF THE INVENTION

In multi-application devices, for example, in smartcards, several different applications, that is, independent software programs, are generally loaded into its NVM. During the life of a smartcard, applications may frequently be added and/or deleted from the memory. Since each application requires a contiguous address space, of memory blocks, in the memory, but different applications will be of different sizes, the deletion and addition of applications leaves small free spaces (often called holes) in the address space. This is called fragmentation of memory.

Fragmentation of memory results in poor utilisation of memory. Sometimes, it may not be possible to load a new application, even if its size is less than the sum of all the free spaces, since an application can only be loaded if its size is smaller than the largest available contiguous free space.

A number of ways to reduce fragmentation of memory are known. Several schemes are known to try to reduce fragmentation by loading new applications into the memory in particular ways. For example, a new application can be loaded into the smallest available free contiguous space that is large enough to hold the application (this is known as the "best fit" method). This method leaves small chunks of memory that are often unusable because they are too small for any application, but can still add up to a sizable amount of memory when there are a large number of such small chunks. Alternatively, a new application can be loaded into the largest available free space, thereby leaving larger, possibly usable, chunks (this is known as the "worst fit" method), or can be loaded into the next (second) available space (known as the "next fit" method). Other schemes are also known.

None of the schemes, however, solve the problem of loading an application where none of the free chunks of memory are sufficiently large for the new application, even when, overall, the free memory space is more than sufficient for the application. It is known to compact memory by moving all the applications together so as to be adjacent each other. However, if there is a power failure during the compaction process, some information may be lost. The problem can be mitigated by storing information being moved in a back-up buffer, but, in some devices such as smart cards, there is a limited amount of memory available and consequently back-ups may not be possible. Furthermore, even if the memory is available, the backing-up scheme requires more time to carry out.

Furthermore, when multiple applications are stored on a smartcard, it is sometimes necessary to have runtime-enforced mechanisms (sometimes called "firewalls") to isolate one application from another. In this environment, isolation means that one application cannot access data of another application, unless that other application explicitly provides an interface for such access. These separate protected data spaces are called "contexts"

In general, each application defines a separate context. However, in some cases, for example with a smartcard running Java™ script, such as the Java Card™, more than one application can be contained in a single group, so that all the applications in the group share the same context. During the lifetime of the card, new applications can be created or deleted in the group, so that the size of the group context can vary. This is also true in the case of a context belonging to a single application because the size of the application can vary due to the creation and/or deletion of objects. Thus, providing a fixed allocation of memory for the context is either inefficient in use of memory or restrictive in creation of new applications or objects.

BRIEF SUMMARY OF THE INVENTION

The present invention therefore seeks to provide a method and apparatus for managing a memory which overcomes, or at least reduces the above-mentioned problems of the prior art.

Accordingly, in one aspect, the invention provides a method of managing a memory having a plurality of memory blocks, the method comprising the steps of allocating the memory using logical addresses corresponding to memory blocks, mapping allocated memory blocks to allocated logical addresses, changing the allocation of the logical addresses so as to reduce numbers of unallocated logical addresses between allocated logical addresses, and updating the mapping when the allocation of at least one logical address has been changed.

In a preferred embodiment, the step of changing the allocation of the logical addresses is implemented so as to maximise the contiguity of unallocated logical addresses. Preferably, the step of changing the allocation of the logical addresses comprises moving unallocated logical addresses closer together in a logical address space. Conveniently, the memory is a Non Volatile Memory, for example in a smartcard.

Preferably, the method further comprises the step of initialising mapping of logical addresses to memory blocks, before the step of allocating the memory. The step of initialising preferably comprises randomly mapping the logical addresses to memory blocks.

In one embodiment, the method further comprises the step of accessing an allocated memory block by receiving an address command including a logical address, translating the logical address to the corresponding memory block and accessing the corresponding memory block.

Accordingly, in a second aspect, the invention provides a method of managing a memory having a plurality of memory blocks, the memory having a plurality of applications stored therein, at least one of the applications having a context, the method comprising the steps of allocating the memory using logical addresses corresponding to memory blocks such that the context of an application has contiguous logical addresses, mapping allocated memory blocks to allocated logical addresses, changing the size of at least one context, changing the allocation of the logical addresses so as to maximise the contiguity of logical addresses allocated to the at least one context, and updating the mapping when the allocation of at least one logical address has been changed.

In a preferred embodiment, the step of changing the allocation of the logical addresses comprises moving allocated logical addresses closer together in a logical address space. Conveniently, the memory is a Non Volatile Memory, for example in a smartcard.

Preferably, the method further comprises the step of initialising mapping of logical addresses to memory blocks, before the step of allocating the memory. The step of initialising preferably comprises randomly mapping the logical addresses to memory blocks.

In one embodiment, the method further comprises the step of accessing an allocated memory block by receiving an address command including a logical address, translating the logical address to the corresponding memory block and accessing the corresponding memory block.

According to a third aspect, the invention provides a memory management circuit comprising an input terminal, an address decoder coupled to the input terminal, an address table coupled to the address decoder, the address table having an output for providing a translation of logical addresses to blocks in a memory, and a controller coupled to the address table to change which logical addresses translate to which memory blocks.

In one embodiment, the controller changes which logical addresses translate to which memory blocks so as to reduce numbers of unallocated logical addresses between allocated logical addresses.

In a second embodiment, the controller changes which logical addresses translate to which memory blocks so as to maximise the contiguity of logical addresses allocated to at least one context stored in the memory.

Preferably, the address table comprises a plurality of latches.

In a preferred embodiment, the memory management circuit further comprising a combining circuit coupled to the input terminal and to the output of the address table for combining at least part of a logical address received at the input terminal with the translation of at least part of the logical address provided by the address table.

BRIEF DESCRIPTION OF THE DRAWINGS

An embodiment of the invention will now be more fully described, by way of example, with reference to the drawings, of which.

DETAILED DESCRIPTION OF THE DRAWINGS

Thus, in an electronic device having a processor and a non-volatile memory, it is desirable to provide a memory addressing scheme that minimises fragmentation of memory. This can be achieved by mapping blocks (pages) in the non-volatile (physical) memory to "virtual" pages in a logical address space. The pages in the logical address space can then be "operated" on to optimize memory usage without affecting the physical memory, thereby reducing the chances that data will be lost if power is unexpectedly lost. By maintaining the largest possible block of contiguous pages in the logical address space, new applications are more likely to have sufficient memory available for them to be loaded into the memory. This can be achieved by compacting the pages in the logical address space when an application is deleted so that unallocated pages form one contiguous block.

Figure 1:
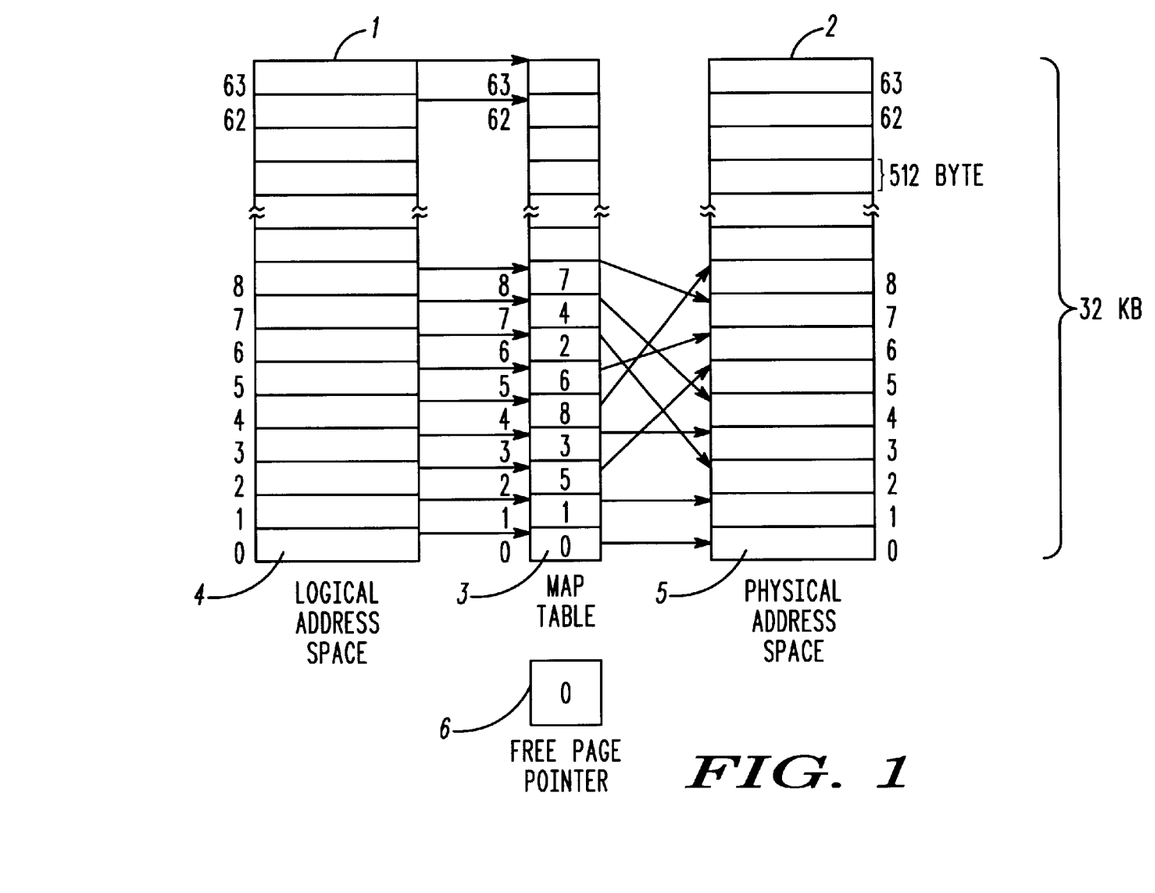
FIG. 1 shows a schematic diagram of how a memory addressing scheme according to one embodiment of the present invention operates.

The scheme is illustrated schematically in FIG. 1, in which are shown a logical address space 1, a physical address space (memory) 2, a map table 3 and a free page pointer 6. The physical address space 2 has a capacity of 32 kB and is divided into 64 pages of 512 bytes each, as is common in many types of non-volatile memory. The pages in the physical address space are numbered from 0 to 63, with the bottom page 5 in the physical address space being numbered "0".

The scheme provides a logical address space 1 whose capacity, number of pages and size of each page are substantially identical to that of the physical address space. Thus, the pages in the logical address space are also numbered from 0 to 63, with the bottom page 4 in the logical address space being numbered "0". A mapping is provided between the pages in the physical address space and the pages in the logical address space. The mapping is maintained in map table 3. One and only one page in the logical address space 1 is mapped to one and only page in the physical address space 2. The map table 3 therefore has 64 entries, one entry for each mapping and is numbered from 0 to 63. The logical page number is used as an index into the map table which then provides the corresponding physical page number. In the example shown in FIG. 1, mapping between the logical and physical pages is given by (0,0), (1,1), (2,5), (3,3), (4,8), (5,6), (6,2), (7,4) and so on, where the first number in each pair of brackets is the logical page number and the second number in the pair of brackets is the corresponding physical page number. The free page pointer 6 contains the index number of the first logical page number which is free. Thus, the map table 3 together with the free page pointer 6 are used to keep track of the used and the unused pages.

Figure 2:
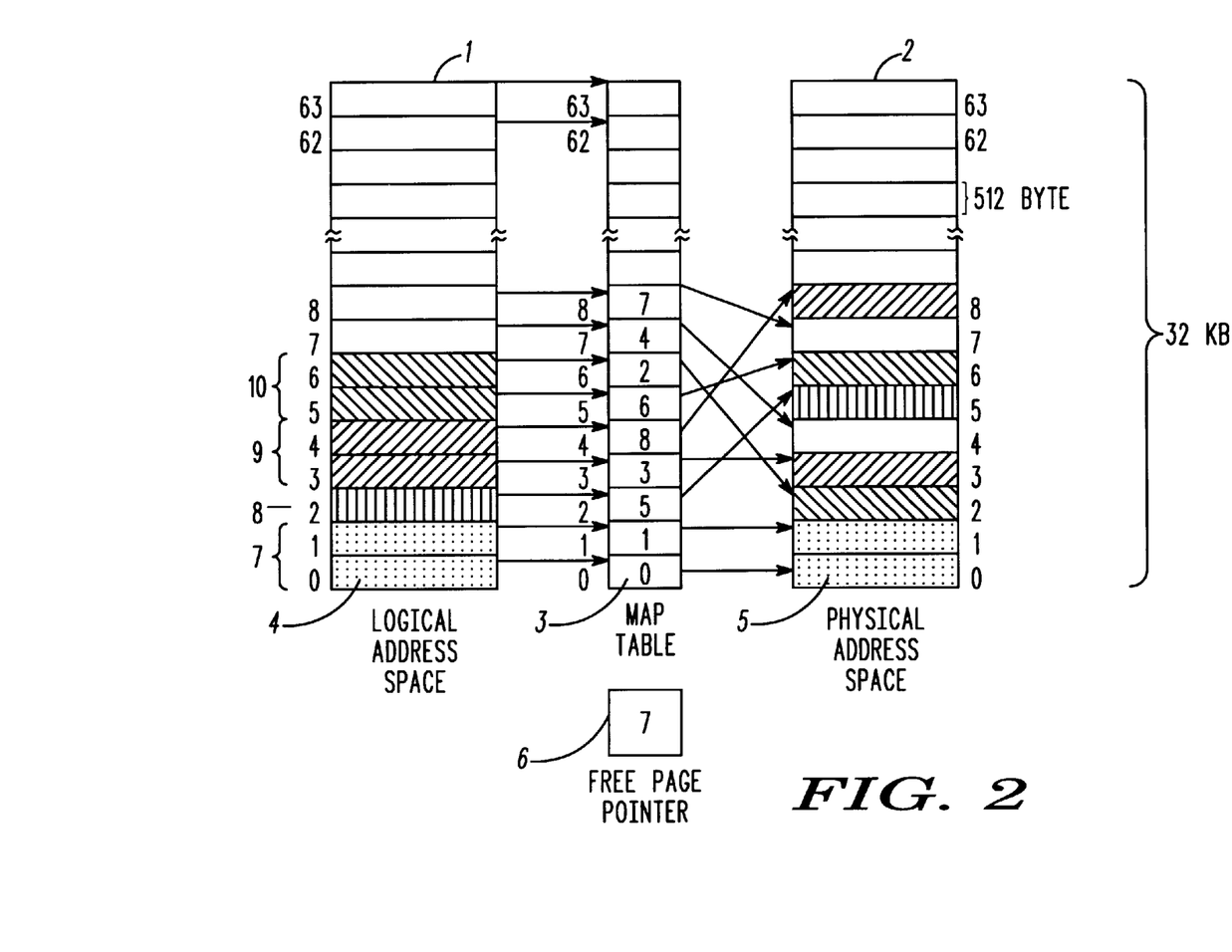
FIG. 2 shows an example of the embodiment of FIG. 1 with four different applications loaded into the memory.

FIG. 2 shows the logical address space 1, the physical address space 2, the map table 3 and the free page pointer 6 after four applications have been loaded into the memory. It can be seen that logical pages "0" and "1" are allocated to a first application 7 and the mapping between the logical pages and physical pages for the first application 7 is (0,0) and (1,1), as also indicated in the map table 3. Logical page 2 is allocated for second application 8, with the mapping between the logical page and physical page for second application 8 being (2,5). Logical pages 3 and 4 are allocated for third application 9. The mapping between the logical pages and physical pages for third application 9 is (3,3) and (4,8). Finally, logical pages 5 and 6 are allocated for fourth application 10. The mapping between the logical pages and physical pages for fourth application 10 is (5,6) and (6,2). Thus, the applications use seven pages of memory (and, of course) seven logical pages. The logical pages used are "0" to "6" so that there are no free gaps between any of the allocated logical pages. Thus, the content of the free page pointer is "7".

Figure 3:
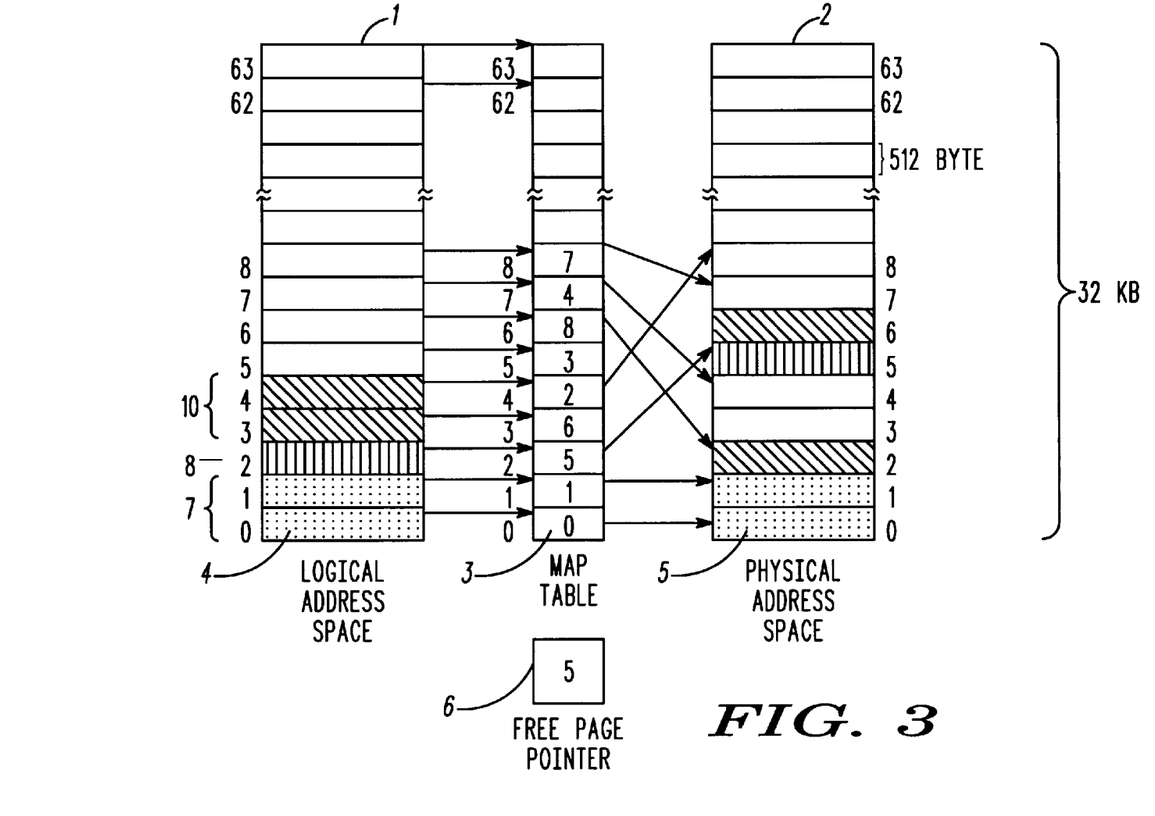
FIG. 3 shows how the example of FIG. 2 changes after one of the applications is deleted.

FIG. 3 shows how the mapping is modified after third application 9 is deleted from the memory. In this case, logical pages "0" and "1" (first application 7) and logical page "2" (second application 8) are unchanged and the mapping between the logical pages and physical pages for first and second applications 7 and 8 is still (0,0), (1,1) and (2,5). Now, however, since the third application 9 has been deleted, logical pages "3" and "4" are reallocated to the fourth application 10 so as to remove the gap in the logical address space that would otherwise occur. The mapping between the logical pages and physical pages for the fourth application 10 is therefore (3,6) and (4,2), since the physical pages where the fourth application 10 is stored are unchanged. Thus, memory compaction has occurred in the logical address space by moving the fourth application 10 down to fill up the free logical address pages created by the deletion of the third application 9. As a result of the memory compaction, the logical address space maintains the largest contiguous block of free pages possible and the content of the free page pointer is "5".

It will be appreciated that mapping information for unallocated pages does not need to be used until those pages are allocated. In this scenario, physical pages "3" and "8" which were previously allocated for the third application 9 are mapped to logical pages "5" and "6". However, the present scheme provides that the mapping of the freed physical pages can be left unspecified.

Figure 4:
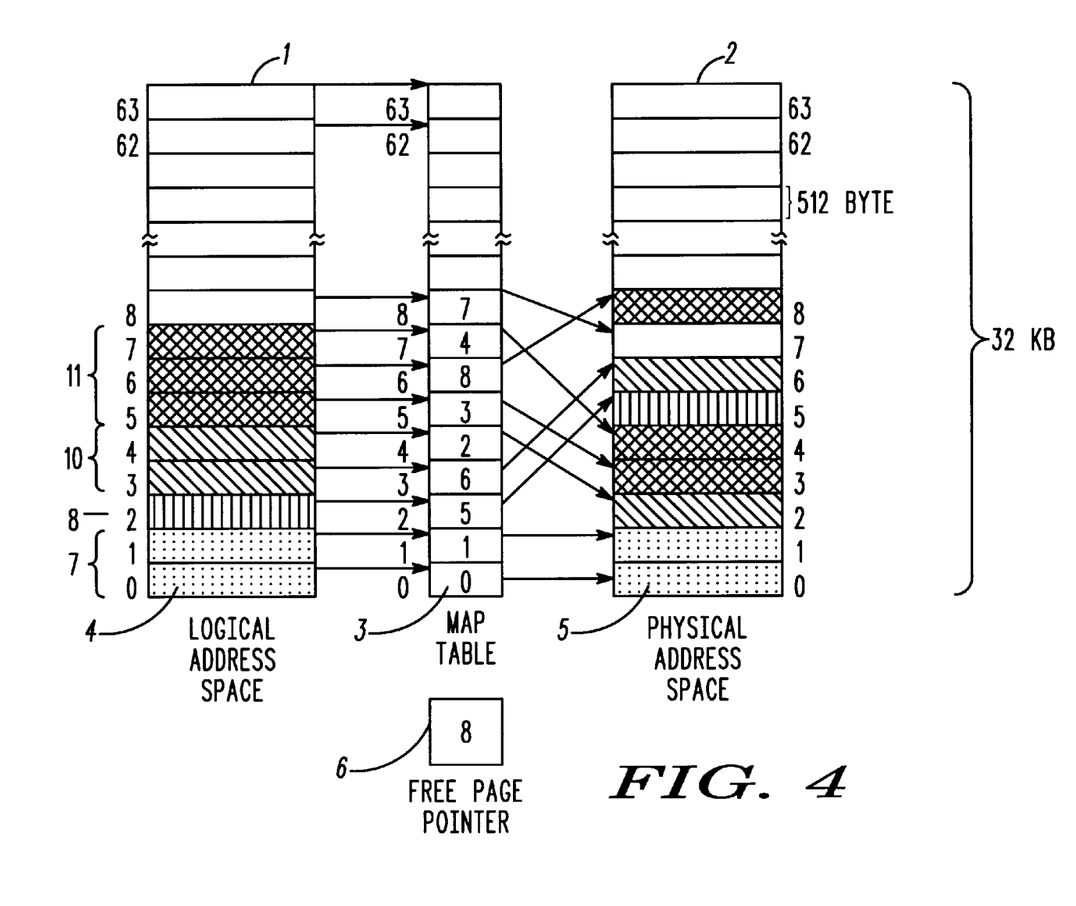
FIG. 4 shows how the example of FIG. 3 changes after a further application is added.

FIG. 4 shows how the mapping changes after the allocation of memory for a fifth application 11, which requires 3 pages of memory. The logical pages "5", "6" and "7" are allocated to the fifth application 11, so that the content of the free page pointer is now "8". The mapping between the logical pages and physical pages for the fifth application 11 is (5,3), (6,8) and (7,4).

Figure 5:
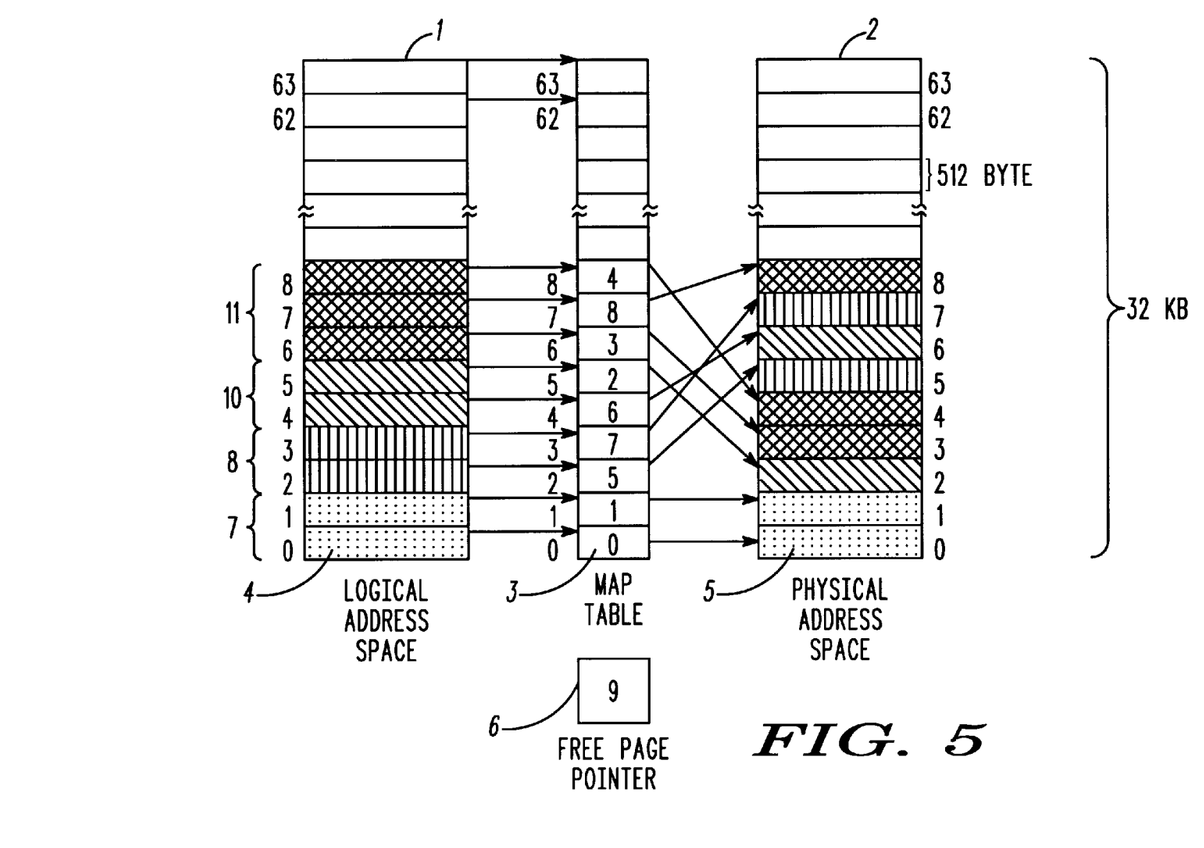
FIG. 5 shows how the example of FIG. 4 changes after the context of one of the applications is increased.

FIG. 5 shows how the mapping is modified after the context of the second application 8 is increased by adding a further page. In this case, the fourth and fifth applications 10 and 11 are moved up by one page in the logical address space and the space for the second application 8 is increased to include the resulting free logical page "3". As a result of the memory compaction, all the applications in the logical address space maintain contiguous blocks of pages. Thus, the mapping for logical pages "0" and "1" (first application 7) and logical page "2" (second application 8) are unchanged as (0,0), (1,1) and (2,5), while the mapping for logical page "3" is now changed to (3, 7). Now, however, since the fourth and fifth applications 10 and 11 have been moved in the logical address space, their mapping to the physical address space must change. Accordingly, the mapping between the logical pages and physical pages for the fourth application 10 is therefore (4,6) and (5,2), and the mapping for the fifth application 11 is (6,3) and (7,8), since the physical pages where the fourth and fifth applications are stored are unchanged. The content of the free page pointer 6 is now "9".

Figure 6:
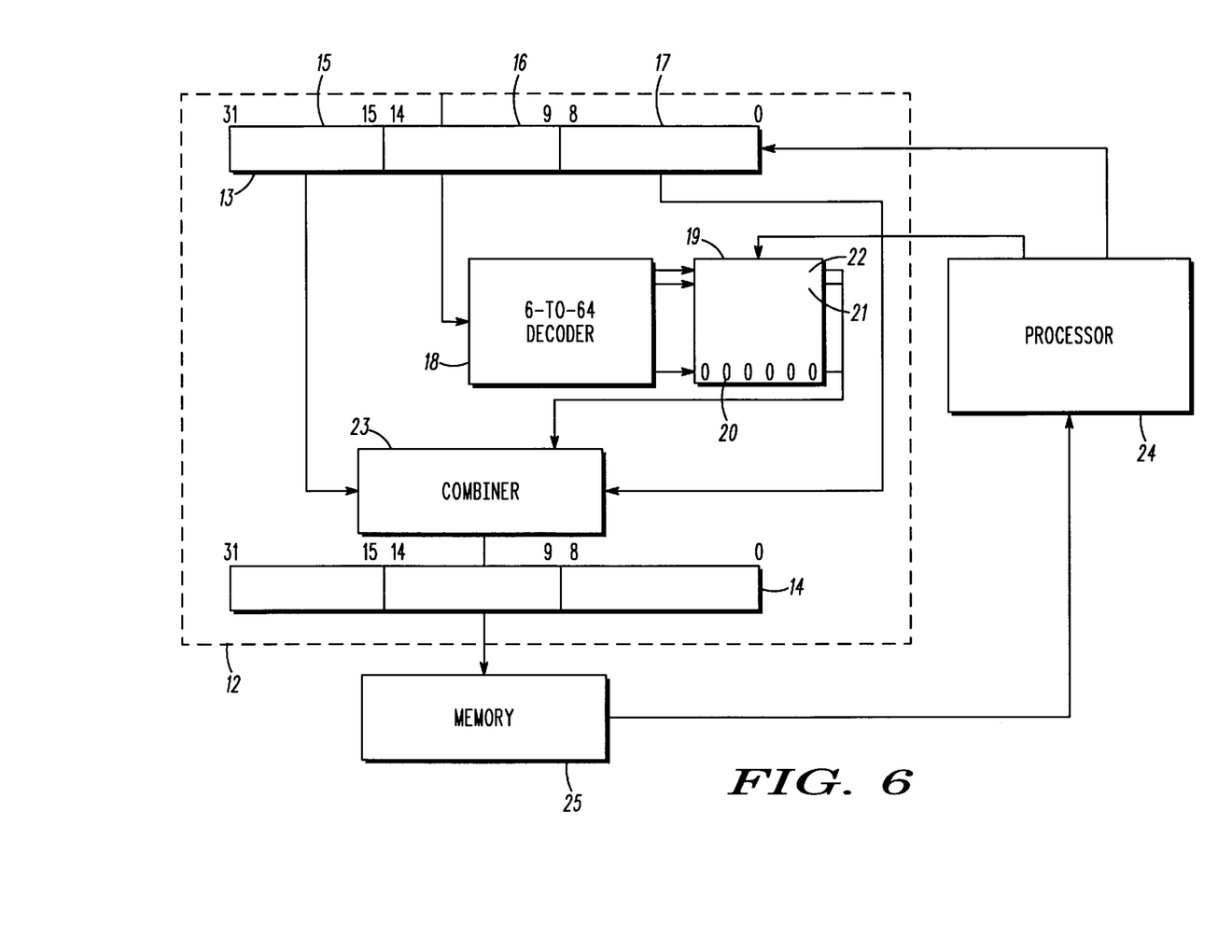
FIG. 6 shows a schematic diagram of an apparatus utilising the memory addressing scheme of FIG. 1.

FIG. 6 shows a schematic block diagram of an address translation logic circuit 12 which can be implemented in hardware as part of a Memory Management Unit (MMU) of a microcontroller. In this example, the microcontroller is a 32 bit microcontroller. The address translation logic circuit 12 translates a 32 bit logical address 13 received from a processor 24 to a 32 bit physical address 14, which is used to access a non-volatile memory 25. The physical non-volatile memory 25 consists of 64 pages of 512 bytes each. The bits in the incoming 32 bit logical address 13 are numbered from "0" to "31", with bit "31" being the most significant bit. The logical address 13 is split into three parts, the most significant bits 15 from bit "31" to "15", the least significant bits 17 from bit "8" to "0", and the middle bits 16 from bit "16" to "9". The middle bits 16 are input to a 6-to-64 bit decoder 18. These middle bits 16 are interpreted by the decoder 18 as an index to the page table, which is implemented as a set of 64×6 bit latches 19. Of this set 19, the least significant latch 20 corresponds to a page table entry of index "0", the next significant latch 21 corresponds to a page table entry of index "1", and so on, with the most significant latch 22 corresponding to a page table entry of index "31".

Each of the latches 19 is set with the 6 bit physical address which translates to the corresponding logical address of that latch. In other words, each of the 64 possible logical addresses refers to a particular latch. By changing the latch setting, the physical address corresponding to that logical address is changed, thereby providing the page table. As described above, when an application is deleted, the logical addresses of all the applications which were loaded after the deleted one are changed so as to compact the logical address space. Thus, the latch settings of all the latches which correspond to logical addresses that have been changed, must be changed to maintain the correct translation of the new logical address to the old physical address, since the physical address where these applications are stored in the physical memory has not changed.

Therefore, the decoder 18 receives the 6 middle bits 16 of the logical address, decodes those 6 bits into one of 64 possible latch indices, and selects the appropriate latch. The setting of the selected latch, which is 6 bits, is then output to be combined with the most significant portion 15 and the least significant portion 17 of the logical address 13.

It will be appreciated that the mapping information stored in the latches must be persistent. Therefore, the contents of the latches must be stored in the non-volatile memory and the latches must be initialized on power-up. The initial values of the latches can be set to be identical to their corresponding logical address index value. Thus, the latch setting will change only when compaction of the logical address space has taken place such that the latch settings have been changed. In this case, the latch setting is output to a selection circuit 23. The selection circuit 23 also receives the original middle bits 16 of the logical address 13 and selects whether to use those original middle bits 16 or the output of the latch to form the combined physical address 14. The selection depends on the value of a page select signal, for example the value of bit "15" in the logical address 13. This bit "15" indicates whether there has been any changes in the mapping of the logical address to the physical address.

Alternatively, the initial values of the latches can be set to random non-repeating valid values (0 to 63) so that the mapping is unique for each processor. In this case, the selection circuit 23 must always combine the output from the latch with the most significant portion 15 and the least significant portion 17 of the logical address 13 to form the physical address 14.

The latch settings are controlled by the processor 24. When a new application is to be loaded, the processor first reads the free page pointer, which is stored in the memory 25. The free page pointer indicates to the processor the next unallocated logical address which is to be used for the application. The processor then loads the application and determines whether more than one page is used. The processor then updates the free page pointer. When an application is to be deleted, the processor first determines whether it is the same as the last application to have been loaded. If it is, then no compaction of the logical address space will be necessary. If it is not, then the processor determines how many pages were used by the application that is being deleted and then compacts the logical address space.

As described above, the compaction process involves "moving" all the remaining applications so as to be contiguous in the logical address space. This is done by determining the lowest logical address of the deleted application and changing the logical address of the next higher remaining application to that lowest logical address by changing the latch setting of the latch corresponding to that lowest logical address to the setting corresponding to the physical address of that remaining application. In other words, the latch setting of the next higher remaining application is copied into the latch corresponding to the lowest logical address of the deleted application.

A similar process is used if a loaded application is to have its context increased or decreased.

It will be appreciated that although only one particular embodiment of the invention has been described in detail, various modifications and improvements can be made by a person skilled in the art without departing from the scope of the present invention.

What is claimed is:

1. A memory management circuit comprising:
   an input terminal;
      an address decoder coupled to the input terminal;
   an address table coupled to the address decoder, the address table having an output for providing a translation of logical addresses to blocks in a memory;
   a controller coupled to the address table to change which logical addresses translate to which memory blocks; and
   a combining circuit coupled to the input terminal and to the output of the address table for combining at least part of a logical address received at the input terminal with the translation of at least part of the logical address provided by the address table,
   wherein in use the controller changes which logical addresses translate to which memory blocks so as to reduce numbers of unallocated logical addresses between allocated logical addresses.

2. A memory management circuit according to claim 1, wherein allocation of the logical addresses by the controller is implemented so as to maximise the contiguity of unallocated logical addresses.

3. A memory management circuit according to claim 1, wherein the memory blocks are stored in a Non Volatile Memory of a smartcard.

4. A memory management circuit according to claim 1, wherein the controller changes which logical addresses translate to which memory blocks so as to maximise the contiguity of logical addresses allocated to at least one context stored in the memory.

5. A memory management circuit according to claim 1, wherein the address table comprises a plurality of latches.

* * * * *